3,846,206
METHOD FOR BONDING CONCENTRIC TUBULAR ELEMENTS TO ONE ANOTHER
John H. Busma, Jr., Mountain View, and Curtis M. Romander, Los Altos Calif., assignors to Stanford Research Institute, Menlo Park, Calif.
Filed June 28, 1972, Ser. No. 267,220
Int. Cl. B32b *31/12*
U.S. Cl. 156—294                            3 Claims

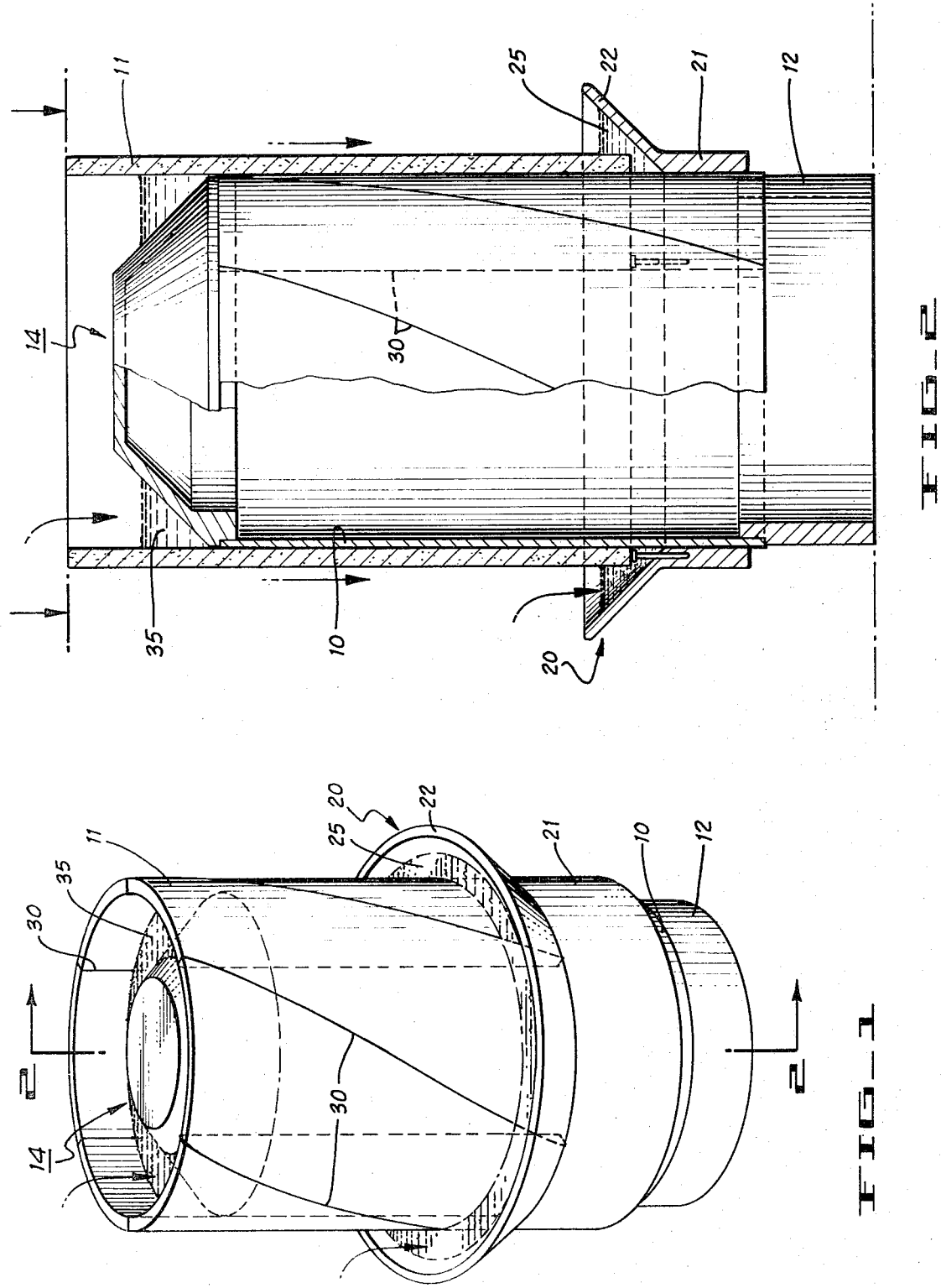

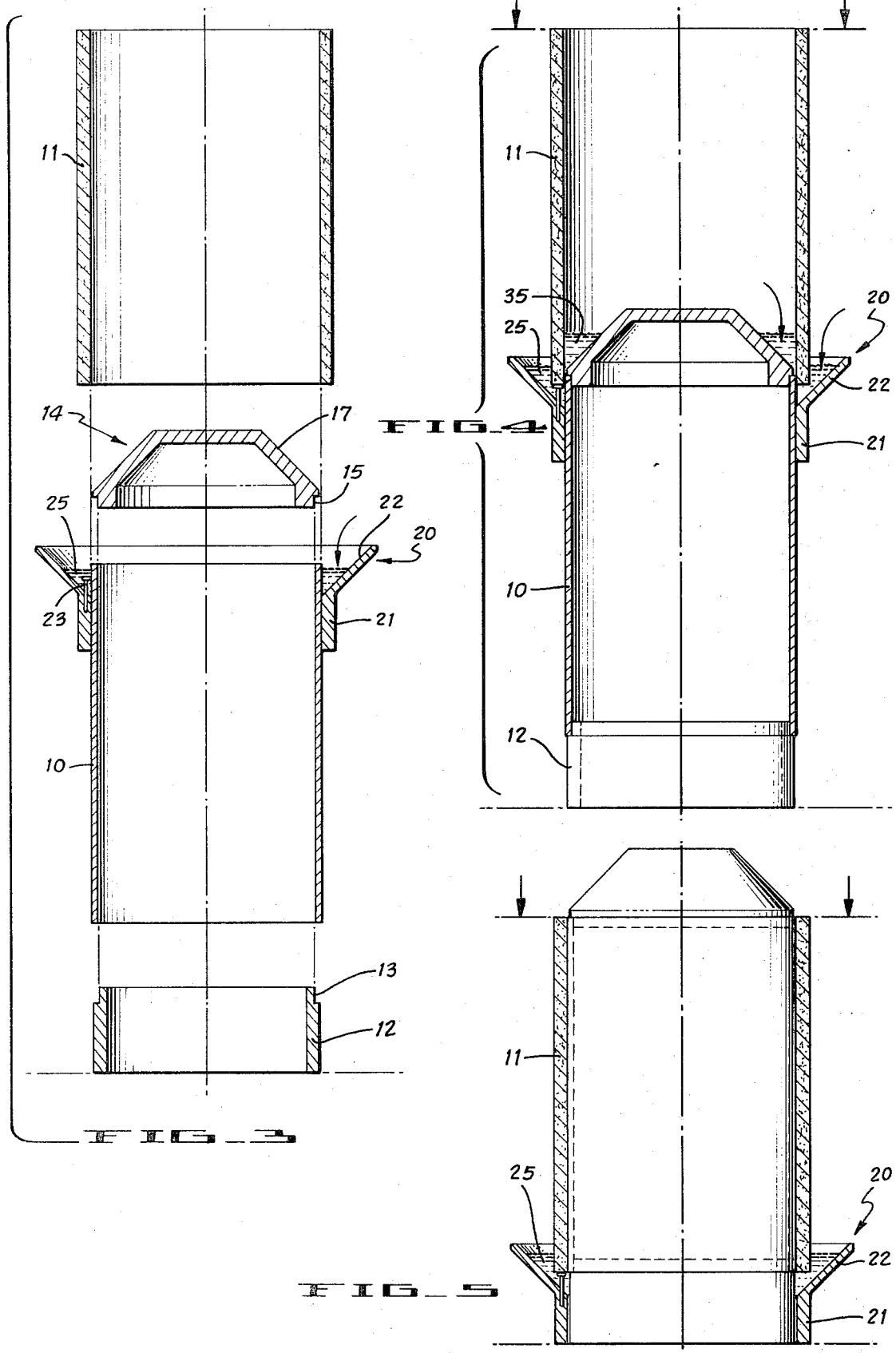

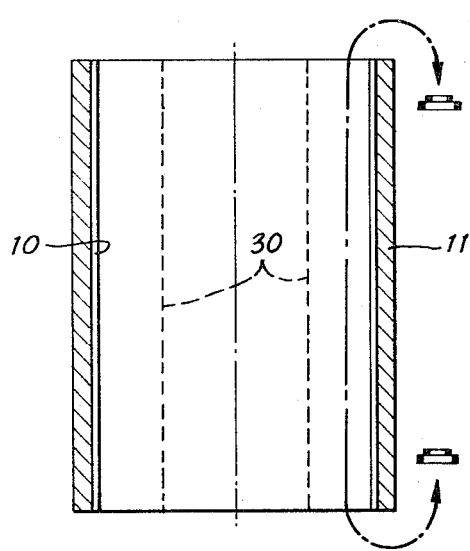
FIG_6
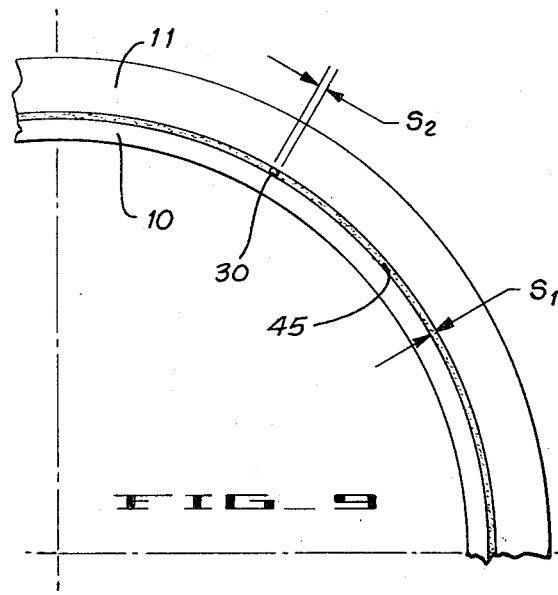
FIG_7
FIG_9
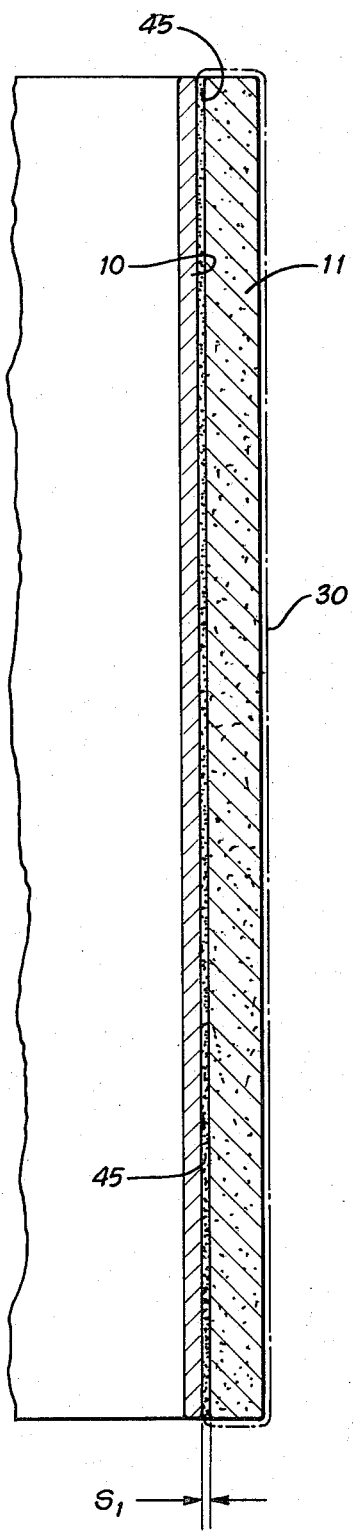
FIG_8

# United States Patent Office 3,846,206
Patented Nov. 5, 1974

ABSTRACT OF THE DISCLOSURE

A method for bonding concentric tubular elements to one another wherein a controlled even layer of viscous bonding material is deposited between the adjacent walls of the two elements as the outer element is slid downwardly into place about the inner element. In carrying out this method a reservoir of the viscous material is supported above the inner element for contact with the inner wall of the outer element as the latter is set in place ready for lowering, whereby this inner wall becomes uniformly coated with the bonding material as the outer element is lowered. An annular reservoir of the viscous material is supported for contact with the outer wall of the inner element by a slidably mounted collar carried by said element. Said collar is adapted to be moved downwardly and thus to coat said outer wall as the outer element is lowered into place about the inner element.

---

The invention herein described was made in the course of or under a contract with the Defense Nuclear Agency.

BACKGROUND OF THE INVENTION

It is frequently desired to bond tubular elements together in a concentric fashion to accomplish one or more of a variety of objectives. For example, a thin walled metal pipe section may be bonded within a heavy enclosing casing fabricated of a material which can provide the requisite strength and any desired insulation to the enclosed inner element.

In forming such unions it has heretofore been necessary, as a practical measure, to apply the fluid bonding material by hand, and since both wall surfaces to be joined are normally coated with the adhesive material, great difficulty has been experienced in applying the same evenly over the respective surfaces. It has also been necessary to use a bonding material having relatively long pot life, with the result that in many instances the bonded article must be maintained in a supported position for a relatively long period in order to allow the adhesive to set and form a firm bond.

It is an object of the present invention to provide a method of concentrically bonding tubular elements to one another which allows of an even application of adhesive to both surfaces to be joined, thereby making it possible to provide a finished article in which no voids exist in the bond layer coupling the two elements together. A more particular object is to provide a method of this character wherein the two wall surfaces to be bonded to one another are simultaneously coated as the two sections are brought into concentric registry. A further object is to provide a method of this character which allows bonding materials of short pot life to be used, thereby reducing the requisite bond setting time to a minimum. A still further object is to provide a method of the foregoing character which is adapted for use with tubular elements of both large and small cross-sectional areas.

SUMMARY OF THE INVENTION

It has been discovered that the foregoing and other objects of the invention can be achieved by the practice of a method for bonding two tubular elements to one another in a concentric fashion, wherein the two wall surfaces to be bonded are separately and simultaneously coated with the viscous bonding material as the outer element is lowered into place about the inner element. The resulting bond layer thus produced between the elements is extremely uniform in thickness and without any void.

More particularly, the method is one wherein a reservoir of the bonding material is supported immediately above the inner element for application about the entire inner wall of the outer element as the latter is brought into position atop the inner element and is lowered thereabout. Here the inner wall serves to confine the material present in the reservoir, and the practice is to pour said material into the resorvoir after the outer element has been positioned ready for lowering, thus confining the material. In order to apply the viscous bonding material to the surfaces of the outer wall of the inner tubular member, a peripheral reservoir of the material is supported for application to said outer wall by a slidably mounted collar carried about the periphery thereof, the surface of said outer wall serving to confine the material in the reservoir. The collar is adapted to be moved downwardly by the descending outer tubular element and thus to coat the adjacent outer wall surface over its entire length.

DESCRIPTION OF THE PREFERRED EMBODIMENTS

The invention will best be understood from the following descrpition when read in conjunction with the accompanying drawings wherein, FIG. 1 is an isometric view showing an outer tubular element partially enclosing an inner tubular element, and also showing one body of fluid adhesive atop the inner member and another carried by a slidably mounted collar;

FIG. 2 is a sectional view taken along the line 2—2 of FIG. 1, with certain of the parts being shown, for clarity, in elevation;

FIG. 3 is an exploded sectional view, in elevation, showing the respective outer and inner tubular elements and the associated apparatus employed to support said elements and the adhesive;

FIGS. 4 and 5 are sequential views, FIG. 4 showing the position of the tubular elements and the adhesive bodies at the intiation of the bonding process, with FIG. 5 showing the tubular elements as concentrically bonded together;

FIG. 6 is a longitudinal section view through the bonded tubular elements;

FIG. 7 is a plan view of the bonded tubular elements;

FIG. 8 is an enlarged sectional view along the line 8—8 of FIG. 6; and

FIG. 9 is an enlarged plan view along the line 9—9 of FIG. 7.

Referring to FIGS. 1 through 5 of the drawings, there is shown a hollow cylinder 10 shaped to fit snugly within an outer cylinder 11 as the two members are brought into concentric registry, the tolerance between the cylinder walls in said registry being such as to permit the containment of a thin layer of an adhesive which serves to bond the two cylinders together.

In preparing to join these members, cylinder 10 is set into place upon a support 12, with a lower end of the cylinder seating within an annular recess 13 cut about the upper margin of the support, the latter having an outside diameter which is similar to, but not greater than, that of cylinder 10. A cap 14 is seated on the upper end of said cylinder, this end seating within an annular recess 15 cut about the lower face of the cap. The upper cap surface is shaped to provide an outwardly and downwardly inclined annular wall section 17 which terminates a short distance away from the internal wall of cylinder 11 as the latter is brought into position above cylinder 10 for lowering thereover.

Slidably mounted about cylinder 10 is a collar 20 having a lower, cylindrical section 21 shaped to engage the outer cylindrical wall, together with an upwardly and outwardly inclined lip 22. Collar 20 is also provided with spaced posts 23 which serve to support cylinder 11 as the lower end surfaces thereof come to rest against said posts. The space between lip 22 and the adjacent wall of cylinder 10 provides an annular reservoir 25 in which to contain the fluid adhesive used to bond the two cylinders together.

With the collar 20 in its uppermost position, as shown in FIGS. 3 and 4, the cylinder 11 is now set itno position above cylinder 10 and resting on the collar posts 23, it being noted that cylinder 11 is longitudinally wound with cord 30 to facilitate maintaining a uniform space between the adjacent walls of the two cylinders as they become bonded together.

If not previously added, the fluid adhesive is now placed in reservoir 25. Another quantity of the adhesive is placed in the reservoir 35 formed by the cap wall section 17 and the adjacent internal wall of cylinder 11. As the latter cylinder is now pressed downwardly, the internal wall thereof is provided with adhesive which is wiped to leave a thin even layer of the adhesive as the wall passes the closely positioned, peripheral margin of cap 14 and reaches an overlying position with respect to the cylinder 10, said cap having a maximum diameter, taken adjacent the position of support of the bottom of reservoir 35, which is but slightly less than the internal diameter of cylinder 11. Simultaneously with the deposition of this thin adhesive layer, adhesive from reservoir 25 is evenly applied to the outer wall surface of cylinder 10 as the collar 20 is forced downwardly by the advancing cylinder 11. However, all but a thin film of the adhesive so applied is wiped off by the leading edge of cylinder 11 as the latter moves downwardly and finally reaches its fully enclosing position about cylinder 10. When said position is reached the net result is that the two cylinders are regularly spaced from one another by an even, void-free layer of adhesive.

This regular spacing aspect of the invention is more particularly shown in FIGS. 6 through 9 wherein an adhesive layer 45 is shown as having a regular thickness $S_1$ which corresponds with the thickness $S_2$ of the cord 30. At the termination of the bonding procedure, the exterior portions of this cord are cut off, the cap 14 is removed (the adhesive thereon being either exhausted or poured back into an adhesive container), and the adhesive-bound cylinder assembly is lifted from the support 14. This cylinder assembly is preferably now placed with one end on a flat surface to prevent the adhesive from escaping as it sets up or cures thus forming the permanent bond which is desired. Inasmuch as the outer surface of cylinder 11 may bear a certain amount of excess adhesive, the preferred practice is to pre-wrap the outer wall of cylinder 11 with a heavy paper (not shown) over which the cord 30 is wound. With the conclusion of the cylinder bonding step, this outer paper and cord wrapping may be cut away, leaving a fresh, outer cylinder wall surface.

The collar 20, now supported about the base member 14 or else removed therefrom, and with its content of adhesive being exhausted either by application to the cylinder wall surfaces or otherwise, may be freed of adhesive by using an appropriate solvent. The same holds true of the cap 14.

We claim:

1. A method for bonding inner and outer tubular elements to one another in a concentric position, said method comprising providing a reservoir of viscous bonding material above the inner tubular element for application to the inner wall of the outer tubular element as the same is set into place above the inner element and is lowered thereover, said reservoir being supported by a cap set upon the inner tubular element, and with said inner wall acting to confine the material present in the reservoir; supporting a peripheral reservoir of the bonding material about the outer wall of said inner element by means of a slidably mounted collar for application of the bonding material to said wall as the collar is moved downwardly therealong, said outer wall serving to confine the bonding material present in the peripheral reservoir; and moving the collar downwardly along the inner element by pressing the same with the descending outer element, thereby simultaneously coating the adjacent walls to be joined as the respective inner and outer elements are brought into concentric registry along their full length.

2. The method of claim 1 wherein both the inner and outer tubular elements have a cylindrical shape and wherein the first-mentioned reservoir of bonding material is supported by a cap set upon the inner tubular element, said cap having a maximum diameter, taken adjacent the position of support of the bottom of said reservoir, which is but slightly less than the internal diameter of the outer tubular element, whereby but a thin film of the bonding material remains on the inner wall of said outer element as it passes the point of maximum cap diameter and reaches an overlying position with respect to the inner element.

3. The method of claim 2 wherein the inner element is seated upon a cylindrical support which serves to maintain the lower end of said element in the desired circular shape and which also serves to receive the collar as the same is moved to a position below the inner element.

References Cited
UNITED STATES PATENTS

| | | | |
|---|---|---|---|
| 3,709,751 | 1/1973 | Carlson et al. | 156—294 |
| 2,368,273 | 1/1945 | Tibbetts | 156—294 |

CHARLES E. VAN HORN, Primary Examiner

C. WESTON, Assistant Examiner

U.S. Cl. X.R.

117—94, 95; 156—295